United States Patent [19]

Davidovits

[11] Patent Number: 5,349,118

[45] Date of Patent: Sep. 20, 1994

[54] METHOD FOR OBTAINING A GEOPOLYMERIC BINDER ALLOWING TO STABILIZE, SOLIDIFY AND CONSOLIDATE TOXIC OR WASTE MATERIALS

[76] Inventor: Joseph Davidovits, 16 rue Galilée, Saint Quentin, France, F-02100

[21] Appl. No.: 90,950

[22] Filed: Jul. 13, 1993

Related U.S. Application Data

[62] Division of Ser. No. 855,633, May 1, 1992, abandoned.

[30] Foreign Application Priority Data

Sep. 4, 1990 [FR] France ................ 90 10958

[51] Int. Cl.⁵ .................... B09B 1/00; C01B 33/26
[52] U.S. Cl. .................... 588/252; 588/257; 405/128; 106/624; 106/707; 106/900
[58] Field of Search ........... 106/624, 626, 707, 900; 405/128, 129, 263–266; 588/249, 252, 256, 257

[56] References Cited

U.S. PATENT DOCUMENTS

| | | | |
|---|---|---|---|
| 4,028,454 | 6/1977 | Davidovits et al. | 264/82 |
| 4,349,368 | 9/1982 | Davidovits | 106/84 |
| 4,377,415 | 3/1983 | Johnson et al. | 524/4 |
| 4,472,199 | 9/1984 | Davidovits | 106/813 |
| 4,509,985 | 4/1985 | Davidovits et al. | 106/624 |
| 4,537,710 | 8/1985 | Komarneni et al. | 252/631 |
| 4,640,715 | 2/1987 | Heitzmann et al. | 106/706 |
| 4,642,137 | 10/1987 | Heitzmann et al. | 106/607 |
| 4,842,649 | 6/1989 | Heitzmann et al. | 106/707 |
| 4,859,367 | 8/1989 | Davidovits | 252/628 |
| 5,114,622 | 5/1992 | Funabashi et al. | 252/629 |

OTHER PUBLICATIONS

D. C. Comrie et al., "Geopolymer Technologies in Toxic Waste Management," *Geopolymer '8*, vol. 1, pp. 107–123, Universite de Technologie, Compiegne, France, (1988).

Davidovits et al., "Long Term Durability of Hazardous Toxis and Nuclear Waste Disposals." *Geopolymer '88*, (List continued on next page.)

*Primary Examiner*—Dennis L. Taylor
*Assistant Examiner*—John A. Ricci
*Attorney, Agent, or Firm*—Browdy and Neimark

[57] ABSTRACT

The method of the invention provides a geopolymeric binder in powder, used for the ultra rapid treatment of materials, soils or mining tailings, containing toxic wastes. The geopolymeric binder has a setting time equal to or greater than 30 minutes at a temperature of 20° C. and a hardening rate such as to provide compression strengths (Sc) equal to or greater than 15 MPa, after only 4 hours at 20° C., when tested in accordance with the standards applied to hydraulic binder mortars having a binder/sand ratio equal to 0.38 and a water/binder ratio between 0.22 and 0.27. The preparation method includes the following three reactive constituents:

a) an alumino-silicate oxide $(Si_2O_5,Al_2O_2)$ in which the Al cation is in (IV–V) coordination as determined by MAS-NMR analytical spectroscopy for $^{27}Al$;

b) a disilicate of sodium and/or potassium $(Na_2,K_2)(H_3SiO_4)_2$;

c) a silicate of calcium where the molar ratios between the three reactive constituents being equal to or between $$\frac{(Na_2,K_2)(H_3SiO_4)_2}{(Si_2O_5,Al_2O_2)} \quad 0.40 \text{ and } 0.60$$

$$\frac{Ca^{++}}{(Si_2O_5,Al_2O_2)} \quad 0.60 \text{ and } 0.40$$

such that $$\frac{(Na_2,K_2)(H_3SiO_4)_2 + Ca^{++}}{(Si_2O_5,Al_2O_2)} = 1.0$$

where $Ca^{++}$ designates the calcium ion belonging to a weakly basic silicate of calcium whose atomic ratio Ca/Si is lower than 1.

5 Claims, No Drawings

OTHER PUBLICATIONS vol. 1, pp. 125–134, Universite de Technologie, Compiegne, France, (1988).

Sang et al., "Aluminum-27 and Silicon-29 MAS-NMR Study of the Kaolinite-Mullite Transformation," J. Am. Cearm. Soc., 71 (10), C418–C421 (1988).

Regourd, "Microanalytical Studies of Surface Hydration Reactions of Cement Compounds." *Phil. Tran. R. Soc. Land.* A 310, 85–92 (1983).

Skibsted, "High-speed $^{29}$Si and $^{27}$Al MAS NMR Studies of Portland and High Alumina Cements," *Geopolymer* '88, vol. 3, pp. 179–196, Universite de Technologie, Compiegne, France 1988.

MacKenzie et al., "Outstanding Problems in the Kaolinite-Mullite Reaction Sequence Investigated by $^{29}$Si and $^{27}$Al Solid State NMR," J. Am. Cearm. Soc., 68 (6), 293–297 (1985).

METHOD FOR OBTAINING A GEOPOLYMERIC BINDER ALLOWING TO STABILIZE, SOLIDIFY AND CONSOLIDATE TOXIC OR WASTE MATERIALS

This is a division of application Ser. No. 07/855,633 filed May 1, 1992, now abandoned.

This invention relates to a method for solidifying and disposing waste, particularly solidifying and disposing wastes which are harmful or potentially harmful to man or the natural environment.

In recent years, considerable attention has been directed to the problem of long term disposal of wastes, particularly wastes which are toxic, radioactive or otherwise incompatible with the natural environment. Such wastes are major by-products of the mining, chemical, petroleum, atomic energy and other industries.

In this specification, the term "waste" refers exclusively to a waste product containing toxic products which are harmful to man or to the natural environment. The term "waste stabilization" refers to the chemical conversion of toxic components into a chemical form that is stable and resistant to the leaching of natural waters.

The term "waste solidification" refers to the transformation of a liquid, pasty, semi-solid waste into a cohesive monolithic resistant solid.

In the mining industry, for example, typically huge amounts of gangue minerals must be mined with the ore. The gangue is usually separated from the ore at a mill close to the mine site and is disposed locally, generally in so-called "tailings impoundments". These impoundments are subject to weathering and ground water seepage, leaking into the surrounding environment. Tailings impoundments from non-metallic mines, such as potash mines, frequently have significant salt concentrations which may be leached over time resulting in high chloride concentrations in surrounding water tables. Tailings impoundments of coal mines and many metallic mines often have high sulphide contents. Weathering and subsequent oxidation can produce sulphuric acid, which seeps into the environment, leaching and carrying toxic heavy metals with it.

Conventional inorganic binders are generally used for the stabilization of soils and tailings contaminated with toxic wastes. Yet, these inorganic binders have very limited properties. Portland cement, for example, soluble silicate based and lime based binders (pozzolanic binders) are chemically incompatible for solidification of various wastes, particularly those containing: sodium salts of arsenate, borate, phosphate, iodate and sulfides; salts of magnesium, tin, zinc, copper and lead; silts and clays; coal and lignite. Their solidified wastes do not remain stable for a long time and are easily deteriorated with acidic infiltrations. Heavy concentrations in oxidized sulfides destroy the solidified disposal, and accelerate the degradation and the leaching of the hazardous elements.

Inorganic binders which are well adapted to the stabilization and solidification of toxic wastes pertain to the geopolymeric type of binders, poly(sialate) and poly(sialate-siloxo). Thus, Davidovits Patent (U.S. Pat. No. 4,859,367; PCT WO 89/02766) provides a method for solidifying and disposing of wastes having archaeological long term durability. This method provides solidification and disposal for wastes which are harmful or potentially harmful to man or the natural environment. The method disclosed in U.S. Pat. No. 4,859,367 comprises the steps of preparing an alkali alumino-silicate geopolymer binder, mixing said binder with said toxic and hazardous waste in proportion such that a mixture is made having in situ a geopolymeric matrix of the poly(sialate) (—Si—O—Al—O—) and/or poly(sialate-siloxo) (—Si—O—Al—O—Si—O—) and/or poly(sialate-disiloxo) (—Si—O—Al—O—Si—O—Si—O—) types, said geopolymeric matrix providing simultaneously the stabilization of said toxic elements and the solidification of said waste to produce a solid and stable material: long term stability is provided when, in the geopolymeric matrix, the molar ratio of oxides $Al_2O_3$:$M_2O$ is in the range of 1.5 to 4.0, where $M_2O$ is $Na_2O$ or $K_2O$ or the mixture $Na_2O+K_2O$.

The leachate extraction procedure used in the present invention follows Regulation 309. Revised Regulations of Ontario, 1980, as amended to O.Reg. 464/85, under the Environmental Protection Act, November, 1985, according to:

a 50 g aliqot of pre-ground sample was placed in a 1000 ml polypropylene bottle and 800 ml deionized water added. After fifteen minutes extraction on a rotary tumbler (14 rpm), the solution pH was measured and quantities of 0.5N acetic acid (or hydrochloric acid) added to bring the pH to 5.0. The rotary extraction was continued with adjustments to pH 5.0 as necessary, at intervals of one, three, six and twenty-two hours. At the end of twenty-four hours of extraction, the total volume of liquid added was adjusted to 1000 ml with deionized water and the final pH recorded. The extract was filtered through 0.45 micron membrane. The leachate (filtrate) was analysed for trace metals by DC plasma emission spectrophotometry.

On the contrary leaching tests carried out in the prior art involved no acidic conditions at all, very low leaching tinges, and partial or no stirring of the samples.

The Leaching Procedure used in U.S. Pat. No. 4,116,705 (Chappell), Sep. 26, 1978 is outlined in col. 4, lines 11–16:

The "leachate" is the solution produced by grinding 10 g. of the hard rock-like material produced from the slurry Into a fine powder and stirring with 100 ml. of distilled water at 20° C. for 1 hour in a magnetically stirred vessel and filtering through a Watman No. 1 filter paper, unless otherwise stated.

The leaching tests used in German Patents DE 24,26,641 (Chappell) and DE 29,44,484 (Chappell) follow the same leaching procedures as described in U.S. Pat. No. 4,116,705 above. In the leaching test carried out in German Patent DE 26,34,839, 90 g of the rock-like material are immersed in 900 ml of water at room temperature for 72 hours, without any stirring.

It is obvious that the pollutants which have not leached out from the hard-rock like product, when immersed in water, would leach out if submitted to the much aggressive conditions provided by the acidic leaching test conducted according to Canadian Regulation 309, for at least two reasons:

a) the solidified materials claimed In the prior art are vulnerable to acidic solutions, and therefore would have been destroyed during the 24 hours rotary extraction test. This explains why the leaching tests of the prior art Involved only water, 1 hour stirring or no stirring at all.

b) After the destruction of the rock structure, the pollutants would have become solubilized because of the low pH and would have leached out during the 24 hours extraction.

The efficiency of geopolymeric binders in toxic waste management has been outlined in several papers, see for example J. Davidovits & al. and D. C. Comrie & al., in Geopolymer '88, Vol. 1, Proc. of the 1rst Conference on Soft Mineralurgy, 1988, University of Technology, Compiègne, France). In addition to their chemical stability, geopolymeric binders provide early high-strength such as 30 MPa compressive strength after 2 days. This prior art discloses also that, in the case of arsenic treatment, the alkalis (NaOH or KOH), should be added in the form of a solid (flakes) instead of the liquid solution which comprises regular GEOPOLYMITE binders.

In some cases of urgency, however, there Is a need for more rapid geopolymeric binders, able to provide solidification in 30 minutes and compressive strength as high as 15 MPa only after 4 hours at 20° C. The object of this invention is the description of such binders.

The present Invention concerns a method of production of a geopolymeric cement involved in the stabilization, solidification and disposal of toxic wastes, providing high-early strength at room temperature. More specifically the inorganic compositions described In this invention enable production of a geopolymeric cement with a setting time equal to or greater than 30 minutes at a temperature of 20° C. and a hardening rate such as to provide compression strengths (Sc) equal to or greater than 15 MPa, after only 4 hours at 20° C., when tested In accordance with the standards applied to hydraulic binder mortars having a binder/sand ratio equal to 0.38 and a water/binder ratio between 0.22 and 0.27.

The geopolymeric Inorganic compositions according to the present invention giving, rapid hardening geopolymeric cement. (Sc)>15 MPa at 4h-20° C., involve basically three reactive constituents.

The first reagent is an alumino-silicate oxide ($Si_2O_5,Al_2O_2$) in which the Al cation is in (IV-V) fold coordination as determined by MAS-NMR spectrography for $^{27}Al$; this alumino-silicate oxide ($Si_2O_5,Al_2O_2$) is obtained by thermal treatment in an oxidizing medium of natural hydrated alumino-silicates, in which the cation Al is in (VI)-fold coordination as determined by MAS-NMR spectrography for $^{27}Al$. In the previous patents filed by the inventor, the alumino-silicate oxide ($Si_2O_5,Al_2O_2$), was defined only by Al cation in (IV)-fold coordination, this representing the state of scientific knowledge at the time. At the present time, use of MAS-NMR spectrography has enabled the presence of (V)-fold coordinated Al to be confirmed. Thus the MAS-NMR spectrum shows 2 peaks, one around 50–65 ppm characteristic of 4-coordinated Al, the other around 25–35 ppm which some workers attribute to (V)-fold coordinated Al whereas others consider it to be due to a deformed Al(IV) coordination. (See MacKenzie et al. Journal of the American ceramic Society, Volume 68, pages 298–297, 1985). We shall in what follows adopt the convention of mixed coordination Al(IV-V) for this oxide ($Si_2O_5,Al_2O_2$).

The second reagent is a disilicate of sodium and/or potassium, soluble in water, $(Na_2,K_2)(H_3SiO_4)_2$; it is preferable to use the potassium disilicate, though the sodium disilicate also enables inorganic geopolymeric compositions according to the invention to be produced. It is also possible to use a mixture of the two alkaline disilicates.

The third reagent is a basic calcium silicate, i.e. one having a Ca/Si atomic ratio equal to or greater than 1. It is essentially characterised by its ability to germ, under alkaline attack, a weakly basic calcium silicate. i.e. one having a Ca/Si atomic ratio lower than 1, preferably close to 0.5. This characterisation is established using X-ray photoelectronic spectrometry (XPS), and by determination of the $Ca_{2p}/Si_{2p}$ ratios, as indicated by M. Regourd. Phil. Trans. Royal Society. London, A. 310, pages 85–92 (1983). In the present invention, the preferred basic calcium silicates are vitreous gehlinite, achermanite and wollastonite.

The Inorganic compositions of the invention are also called inorganic geopolymeric compositions, since the geopolymeric cement obtained results from an inorganic polycondensation reaction, a so-called geopolymerisation, unlike traditional hydraulic binders in which hardening is the result of the hydration of aluminates of calcium and silicates of calcium. Here too, the investigative tool used is MAS-NMR for $^{27}Al$. The products yielded by a geopolymeric reaction, as described In the present invention, show a single peak at 55 ppm, characteristic of Al(IV) coordination, whereas the hydration products obtained with traditional hydraulic binders show a peak at 0 ppm, characteristic of Al(VI) coordination, i.e. of the hydroxy-aluminate of calcium.

MAS-NMR spectrography of $^{29}Si$ also shows a very clear difference between geopolymers and hydraulic binders. If the degree of polymerisation of SiO4 tetrahedra is represented by Qn (n=0,1,2,3,4), distinction can be made between monosilicates ($Q_0$), disilicates ($Q_1$), linear silicate chains ($Q_2$), grafted silicates ($Q_3$) and silicates forming a three-dimensional lattice ($Q_4$). These various degrees of polymerisation are characterised in MAS-NMR spectrography of $^{29}Si$ by the following peaks: ($Q_0$) from $-68$ to $-77$ ppm; ($Q_1$) from $-78$ to $80$: $Q_2$) from $-80$ to $-85$; ($Q_3$) from $-85$ to $-90$; $Q_4$ from $-91$ to $-130$ ppm. The peaks which characterise the geopolymers occur in the region $-85$ to $-100$ ppm and correspond to the three-dimensional lattice ($Q_4$) which is characteristic of the poly(sialates) and poly(sialate-siloxo). On the other hand, hydration of hydraulic binders yielding hydrated calcium silicate C-S-H (according to the terminology used In cement chemistry), produces peaks in the region $-68$ to $-85$ ppm attributable either to the monosilicate ($Q_0$) or the disilicate ($Q_1$)($Q_2$); (see for example J. Hjorth, Cement and Concrete Research vol. 18 No. 4, 1988 and J. Skibsted Geopolymer '88, Session No. 7, Université de Compiègne, 1988).

According to the terminology in current use for geopolymers (see for example Geopolymer '88. Volume 1, Acres du Congrés Geopolymer '88, Université de Technology, Compiègne, France), the rapid-setting inorganic binder, (Sc)>15 MPa at 4 h, 20° C., corresponds to a geopolymer of the type (Ca,K)-poly(sialate-siloxo) of formula varying between (0.6K+0.2Ca)(—Si—O—Al—O—Si—O—),H$_2$O and (0.4K+0.3Ca)(—Si—O—Al—O—Si—O—),H$_2$O.

There have been proposed in the past binders and cements showing rapid setting and based on geopolymeric reactions Involving the three reagents used in the present invention.

Thus, for example, the patent Davidovits/Sawyer (U.S. Pat. No. 4,509,985) and its European equivalent EP 153,097, describe geopolymeric compositions enabling production of rapid-setting mortars developing a compression strength Sc=6.89 MPa after 1 hour at 65° C. and Sc=41.34 MPa after 4 hours at 65° C. There is also mentioned in one of the examples from these patents a composition named "Geopolymer example II", developing a compression strength Sc=24 MPa after 4 hours at 23°–25° C. From experience squired by workers in the field, a compression strength Sc=15 MPa after 4 hours at 20° C. is equivalent to a value of Sc=22.5 MPa after 4 hours at 25° C. This composition comprises 840 g of so-called "standard" reaction mixture to which has been added, apart from inert fillers, 220 g of ground high furnace slag. The reactive geopolymeric constituents are characterised by the molar ratios of their oxides:

$K_2O/SiO_2$ 0.32
$SiO_2/(Al_2O_3)$ 4.12
$H_2O/(Al_2O_3)$ 17.0
$K_2O/(Al_2O_3)$ 1.33
$H_2O/K_2O$ 12.03 which, to enable comparison with the inorganic geopolymeric compositions of the present invention, corresponds to a geopolymeric composition of 1 mole of alumino-silicate oxide $(Si_2O_5,Al_2O_2)$, i.e. 222 g. 1.12 moles of potassium disilicate, $K_2(H_3SiO_4)_2$, i.e. 300 g 0.21 moles of $K_2O$ corresponding to 28 g of 90% anhydrous KOH, 290 g of water and 220 g of slag.

Compared with the alumino-silicate oxide $(Si_2O_5,Al_2O_2)$ in the composition described in U.S. Pat. No. 4,509,985, the molar ratio of $K_2(H_3SiO_4)_2$ to $(Si_2O_5,Al_2O_2)$ is easily seen to be 1.12.

The greatest contribution to the price of inorganic geopolymeric compositions is that of the potassium disilicate $K_2(H_3SiO_4)_2$. It was thus very important to find a way of substantially reducing the quantity of this very costly substance. This is the main objective of the present invention.

In the terms of the invention, Inorganic geopolymeric compositions are characterised by the molar ratios between the three reactive constituents which are equal or between $$\frac{(Na_2,K_2)(H_3SiO_4)_2}{(Si_2O_5,Al_2O_2)} \; 0{,}40 \text{ and } 0{,}60$$

$$\frac{Ca^{++}}{(Si_2O_5,Al_2O_5)} \; 0{,}60 \text{ and } 0{,}40$$

such that $$\frac{(Na_2,K_2)(H_3SiO_4)_2 + Ca^{++}}{(Si_2O_5,Al_2O_5)} = 1{,}0$$

where $Ca^{++}$ represents the calcium ion belonging to a weakly basic silicate of calcium.

As can be seen, the quantity of alkaline disilicate is reduced by 200% to 300% compared to the quantity previously required.

To achieve this, it is not In fact sufficient simply to reduce the quantity of this alkaline disilicate; the inventor was surprised to realise that, what was essentially necessary, was to change the physical state of the constituents.

Thus, the compositions of the Davidovits/Sawyer U.S. Pat. No. 4,509,985 are in the liquid phase. The slag is added to an aqueous reaction mixture containing the alumino-silicate oxide $(Si_2O_5,Al_2O_2)$, the alkalis, the water and the potassium polysilicate in solution.

In contrast, in this Invention, the inorganic geopolymeric compositions are in the solid phase, In particular the second reactive constituent, the sodium and/or potassium disilicate $(Na_2,K_2)(H_3SiO_4)_2$ is in the form of a finely divided powder, the water only being added in the final phase of mixing the mortar or binder.

Inorganic powder compositions are also in the technique in its previous state. Thus the U.S. Pat. No. 4,642,137 (Heitzmann) claims inorganic compositions containing:

100 parts of metakaolin
20 to 70 parts of slag
85 to 130 parts of fine fillers (light ashes, calcinated clays).
70 to 215 parts of amorphous silica
55 to 145 parts of a mixture containing potassium silicate and potassium hydroxide.

with a minimum of 55 parts of potassium silicate.

As Indicated in Heitzmann's U.S. Pat. No. 4,642,137, the amorphous silica essentially has the role of replacing pan of the potassium silicate necessary for the geopolymerisation, i.e. the amorphous silica reacts with potassium hydroxide to produce, in the mortar, the required quantity of potassium silicate. For workers In the field, the term "potassium silicate" used in Heitzmann's U.S. Pat. No. 4,642,137 means industrial potassium silicate, in the form of a powder, corresponding to the formula $K_2O.3SiO_2.3H_2O$, soluble in water and enabling the production of binders and adhesives having the same properties as 'soluble glasses' or alkaline silicates in solution.

However, these formulations according to Heitzmann's U.S. Pat. No. 4,642,137 do not set at room temperature, slice to obtain rapid setting it is absolutely necessary to add portland cement. But even with the addition of portland cement, the compositions claimed do not enable (Sc)>15 MPa at 4h-20° C. Thus for the example giving the best results, example 28, the following mixture is quoted:

68 parts of metakaolin
36 parts of slag
60 parts of light ashes
103 parts of silica powder
44 parts of potassium silicate
22 parts of potassium hydroxide and
423 parts of portland cement.

For the mortar obtained, the compression strength, Sc, after 4 hours at 23° C. is 1000 PSI, i.e. only 6.9 Mpa, which is much lower than (Sc)>15 MPa at 4h-20° C., as claimed in the present invention. In another example, example 27, Sc after 4 hours at 23° C. is only 680 PSI. i.e. only 4.6 MPa, while in the other examples described in U.S. Pat. No. 4,642,137, only values of Sc at 150° F. (i.e. 65° C.) are given, Sc after 4 hours at 23° C. being too small to be mentioned.

Assuming that the metakaolin corresponds to our alumino-silicate oxide $(Si_2O_5,Al_2O_2)$, and that the potassium hydroxide afforded the transformation of potassium silicate $K_2O.3SiO_2.3H_2O$ into disilicate, $K_2(H_3SiO_4)_2$, we obtain by calculation of the Heitzmanns Corporation the following compositions expressed in moles:

$(Si_2O_5,Al_2O_2)$ 0.30 moles
$K_2(H_3SiO_4)_2$ 0.20 moles i.e. a ratio of $K_2(H_3SiO_4)_2$ to $(Si_2O_5,Al_2O_2)$ equal to 0.66. The ratio is actually higher since the excess of potassium hydroxide being 0.13 moles of $K_2O$, as it is claimed that this potassium has reacted with the silica powder to produce 0.13 moles of $K_2(H_3SiO_4)_2$, the final total of $K_2(H_3SiO_4)_2$ is equal to 0.33 moles, giving a ratio of $K_2(H_3SiO_4)_2$ to $(Si_2O_5,Al_2O_3)$ equal to 1.10, which is exactly that quoted in the Davidovits/Sawyer U.S. Pat. No. 4,509,985 and EP 153,097 quoted above.

These examples demonstrate well that the simple replacement of the silicate in solution by silicate in powder form causes a very substantial slowing in the setting since, again according to Heitzmann's U.S. Pat. No. 4,642,137, thermal activation is necessary for rapid setting in a few hours.

Now, in the present invention and contrary to previous technique, it is precisely the use of alkaline disilicate in powder form which enables a geopolymeric cement to be obtained showing rapid setting, at 20° C., in a few hours, with (Sc)>15 MPa at 4h-20° C.

Also quoted in the second Heitzmann U.S. Pat. No. 4,640,715 is replacement of the whole of the potassium silicate in solution by a mixture of amorphous silica (silica powder) and potassium hydroxide. Here too, for rapid setting, portland cement has to be added, and in the best example, example 43, the compression strength Sc after 4 hours at 23° C. is Sc=1100 PSI, i.e. 7.5 MPa, which is much lower than (Sc)>15 MPa at 4h-20° C., as claimed in the present invention.

In this same second patent of Heitzmann, U.S. Pat. No. 4,640,715, the geopolymeric mineral composition comprises 52 parts of metakaolin, 24 to 28 parts of potassium hydroxide, 73 to 120 parts of silica dust, 18 to 29 parts of slag. According to the description in this second patent of Heitzmann, the silica dust reacts with the potassium hydroxide to produce, in the mixture, potassium silicate. This is, according to Heitzmann's second patent, a way of lowering the cost of this very expensive reagent. We calculate to thus obtain for this patent, in moles, according to the same reasoning as above:

$(Si_2O_5,Al_2O_3)$ 0.23 moles
$K_2(H_3SiO_4)_2$ from 0.215 to 0.25 moles.

which gives a ratio of $K_2(H_3SiO_4)_2$ to $(Si_2O_5,Al_2O_3)$ between 0.93 and 1.08, i.e. practically equal to the ratio discussed previously for the first patent of Heitzmann and the Davidovits/Sawyer patent.

These examples of the previous state of the technique readily show that the simple replacement of silicate in solution by a mixture of silica dust and potassium hydroxide causes a very substantial slowing down in the setting, since, according to the second patent of Heitzmann, U.S. Pat. No. 4,640,715, thermal activation is necessary to obtain rapid hardening, in a few hours.

The examples described in the previous Heitzmann patents show that rapid hardening requires a temperature of 40°-60° C. In other words, the mixtures claimed are endothermic; they absorb heat.

The following tests demonstrate that In the previous state of the technique, the endothermicity of the mixtures was too high for rapid hardening at room temperature. It is known that the geopolymerisation reaction, as described in the Davidovits patents U.S. Pat. No. 4,349,386 (FR 2,464,227) and U.S. Pat. No. 4,472,199 (FR 2,489,290), is exothermic, this exothermicity being very obvious when hardening is carried out at 40°-60° C. The exothermicity of mixtures with and without amorphous silica, such as silica dust, has been measured.

The technique used was differential thermal analysis.

| Two powder mixtures are prepared: | | |
|---|---|---|
| powder A: | oxide $(Si_2O_5.Al_2O_3)$ | 400 g |
| | micronised mica | 100 g |
| powder B: | oxide $(Si_2O_5.Al_2O_3)$ | 400 g |
| | silica dust | 100 g |
| and 2 liquid mixtures: | | |
| liquid 1: | potassium silicate, 40% solution | 520 g |
| | KOH, 90% | 82 g |
| liquid 2: | sodium silicate solution, 40% | 1040 g |
| | NaOH powder | 120 g |

Mixing of powder and liquid is carried out according to the proportions indicated in the table, and the geopolymerisation is followed by differential thermal analysis. Values of the ratio J/g are compared, i.e. the amount of energy, measured in Joules divided by the mass of the sample in grammes. The geopolymerisation temperature is 60° C.

| Test No. | Mixture | | J/g |
|---|---|---|---|
| 1 | powder A | 55 g | |
| | liquid 1 | 100 g | 247 |
| 2 | powder B | 55 g | |
| | liquid 1 | 100 g | 53 |
| 3 | powder B | 55 g | |
| | liquid 2 | 100 g | 116 |

It can clearly be seen that the addition of silica dust, i.e. the formation of potassium silicate In the mixture, causes thermal energy to be absorbed. The exothermicity of test No.2 (with silica dust) is five times less than that of test No. 1 (without silica dust), and that of test No. 3 is half that of test No. 1.

This is the explanation given for why the mixtures claimed in the patents of Heitzmann do not set rapidly at room temperature.

On the other hand, in the present invention, the amorphous silica, such as silica dust, or other silicas which are known to transform readily into potassium or sodium silicate at moderate temperatures, or even room temperature, is added in such an amount that it does not perturb the natural exothermicity of the geopolymeric mixture. Amorphous silica, such as for example silica dust, rice ashes, diatomaceous earths, silicic smectites, certain highly silicic pouzzolanes (with a high percentage of allophane and glass of volcanic origin) are considered as finely divided reactive fillers. The reactivity of these fillers makes them react on the surface with the geopolymeric reactive medium, thus increasing the mechanical strength of the poly(sialate-siloxo) mineral binder. These silicic materials are not at first dissolved, at ordinary temperatures, i.e. in the terms of reference of this invention. However, as in the case of hydraulic binders which contain them, it is possible, after not more than 28 days, to observe that they have been digested by the geopolymeric matrix or by the basic silicates still present in the matrix.

The third reactive constituent of the invention is weakly basic calcium silicate with a Ca/Si ratio lower than 1.

This could typically be calcium disilicate $Ca(H_3SiO_4)_2$ or tobermorite $Ca_{10}(Si_{12}O_{31})(OH)_6,8H_2O$. The amount of this third reactive constituent Is linked to the other ones by the mole ratios between the three reactive constituents being equal to or within.

$$\frac{(Na_2,K_2)(H_3SiO_4)_2}{(Si_2O_5,Al_2O_2)} \text{ 0.40 and 0.60}$$

$$\frac{Ca^{++}}{(Si_2O_5,Al_2O_5)} \text{ 0.60 and 0.40}$$

In the cases of calcium disilicate $Ca(H_3SiO_4)_2$ and potassium disilicate $K_2(H_3SiO_4)_2$ the mole ratios are equal or between $K_2(H_3SiO_4)_2/(Si_2O_5,Al_2O_2)$ 0.40 and 0.60
$Ca(H_3SiO_4)_2/(Si_2O_5,Al_2O_2)$ 0.60 and 0.40

In other words, the sum of the number of moles of calcium disilicate $Ca(H_3SiO_4)_2$ and the number of moles of potassium disilicate $K_2(H_3SiO_4)_2$, is equal to the number of moles of alumino-silicate oxide $(Si_2O_5,Al_2O_2)$. This alumino-silicate oxide $(Si_2O_5,Al_2O_2)$ determines all the reaction conditions of the geopolymeric mineral compositions. It reacts with alkali or alkaline-earth disilicates to form, after geopolymerisation, a compound $[Si_2O_5,Al_2O_2,Si_2O_5,(K_2O,CaO)]$, i.e.(K,Ca)-poly(sialate-siloxo) i.e. of formula between $(0.6K+0.2Ca)(—Si—O—Al—O—Si—O—)$ and
$(0.4K+0.3Ca)(—Si—O—Al—O—Si—O—)$ The oxide $(Si_2O_5,Al_2O_2)$ reacts first of all with the most soluble disilicate, which is always the alkaline disilicate $(Na_2,K_2)(H_3SiO_4)_2$. The amount of calcium disilicate taking part in the reaction is essentially determined by the amount of alkaline disilicate. If the sum of the number of moles of these disilicates is greater than 1, the non-reacting part will be that which is the least soluble, i.e. the calcium disilicate.

However, it is the calcium ions which determine the setting speed, by making the alkaline geopolymeric gels less soluble, the optimal setting speed being reached when the $Ca^{++}$ ions are integrated into the geopolymeric structure. If the amount of alkaline $Na^+$ or $K^+$ is large, a larger amount of $Ca^{++}$ ion will be necessary to obtain the same setting speed. On the other hand, if the amount of alkaline disilicate, $(Na_2,K_2)(H_3SiO_4)_2$, is too small, the dissolution of calcium disilicate, $Ca(H_3SiO_4)_2$, will be reduced, rapid setting at 20° C. will not occur, and mechanical strengths will be lower.

This could be the explanation given for the Heitzmann patents for which the ratio $K_2(H_3SiO_4)_2/(Si_2O_5,Al_2O_2)$ was close to or greater than 1, as to why the too high solubility of the reaction medium slowed down the precipitating action of the $Ca^{++}$ ions originating from, for example, slag or portland cement.

Calcium disilicate, $Ca(H_3SiO_4)_2$, can be manufactured separately, for example by hydrothermal reaction between lime and silica.

However, according to a method preferred in the invention, it will be produced in a naissant state in the binder after addition of the water required for solubilising the various powder reagents. The starting material is a basic calcium silicate, i.e. with a Ca/Si atomic ratio equal to or greater than 1. Hydratation should not produce compounds containing free lime (CaO) or Ca(OH)$_2$, which are very sensitive to acidic attack, these compounds resulting generally during hydratation of Portland cement components, bicalcic silicate (2CaO.SiO$_2$) and tricalcic silicate (3CaO.SiO$_2$). On the other hand, other basic silicates such as wollastonite, Ca(SiO$_3$), gehlinite, (2CaO.Al$_2$O$_3$,SiO$_2$), akermanite, (2CaO.MgO.2SiO$_2$) are well adapted. When the particles of these substances come into contact with an alkaline solution (NaOH or KOH), very rapid desorption of CaO occurs, so that the Ca/Si atomic ratio becomes lower than 1 and tends to 0.5 for basic silicates of initial ratio Ca/Si equal to or less than 2, such as wollastonite, gehlinite, akermanite.

Industrial by-products contain essentially the basic silicates gehlinite, akermanite and wollastonite, and are thus very suitable. Some examples are vitreous high furnace slag, bottom ashes and fly-ashes produced in high-temperature power plants. Moreover, as it can be followed by X-ray photoelectronic spectrometry (Xps), as indicated above, this alkaline attack on the basic silicate produces a weakly basic silicate of atomic ratio Ca/Si=0.5, i.e. stoichiometric calcium disilicate, Ca(H$_3$SiO$_4$)$_2$. This process takes place very smoothly and can be complete in 30 minutes at ambient temperature.

The geopolymeric reaction used in the present invention must not be confused with simple alkaline activation of hydraulic binders, or the action by alkalis of accelerating setting of portland cements and other hydraulic binders.

In this respect, the simple action of alkalis. NaOH or KOH, on portland cements or high furnace slag, results in the production of hydrated calcium silicates, as mentioned above. Unlike what happens in the present invention, these hydrated silicates crystallize to form C-S-H, the main constituent of hydraulic calcium-based cements. C-S-H is a mono and/or disilicate, i.e. the SiO$_4$ tetrahedra of which it is composed belong to the categories ($Q_0$), ($Q_1$) and possibly ($Q_2$). On the other hand, geopolymerisation leads to the formation of type ($Q_4$) SiO4 tetrahedra, as determined by NMR MAS spectrum analysis for $^{29}$Si. Geopolymers which are tridimensional alumino-silicates, are stable to acidic attack.

Although the alkalis NaOH and KOH are setting accelerators, they are not hardening accelerators capable of achieving the object of the invention, namely (Sc)>15 MPa at 4h-20° C.

In the case of high-furnace slags, the alkalis are not setting accelerators, but develop the latent hydraulic nature of the slags. The hardening accelerator is in general temperature, or added portland cement, as described for example in the patent of Forss, U.S. Pat. No. 4,306,912 which describes the use of slag-based cement, portland cement or lime, and an alkaline accelerator such as NaOH or the carbonates of sodium or potassium. Compression strengths are all achieved after heating at 50° C. or 70° C. Thus in table 4 of the patent of Forss is found a mean Sc of 20 to 30 MPa after 6 hours at 70° C. Experience in the technique indicates that strengths of 30 MPa obtained after 6 hours at 70° C. correspond to Sc=1 to 3 MPa maximum after 4 hours at 20° C.

Scientific analysis using MAS-NMR spectrography for $^{27}$Al shows that slag-based hydraulic cements result from the hydration of calcium aluminates, silicates and silicoaluminates, with formation either of hydrated gehlinite, (2CaO.Al$_2$O$_3$.SiO$_2$.8H$_2$O), or hydrated calcium aluminate, (4CaO.Al$_2$O$_3$.10H$_2$O), in which the Al cation is in Al(VI) coordination. The MAS-NMR spectrum for $^{29}$Si shows the SiO$_4$ tetrahedra to be mainly of type ($Q_0$), ($Q_1$) or ($Q_2$), characteristic of C-S-H.

Similarly, a mixture composed of alumino-silicate oxide (Si$_2$O$_5$,Al$_2$O$_2$), slag and the alkalis KOH, NaOH, does not constitute a geopolymeric mineral binder according to the present invention. A mortar made with this mixture and water does not harden at 20° C. after 4 hours. This type of reaction is described in the previous patents of one of the inventor. Thus the patents Davidovits U.S. Pat. No. 4,349,386 (FR 2,464,227) and U.S. Pat. No. 4,472,199 (FR 2,489,290) indicate that if the oxide ($Si_2O_5,Al_2O_2$) is not protected by a solution of polysilicate against attack by the strong bases KOH,- NaOH, a simple poly(sialate) of the hydroxysodalite type is formed, and is precipitated without any binding occurring. Hydroxysodalite only forms a binder in ceramic pastes with very little water and when the material is compressed, as claimed in the Davidovits patents FR 2,346,12 1 and FR 2,341,522.

In the terms of the Invention, the third reagent in the inorganic geopolymeric mixture is calcium silicate. It may be accompanied by complex aluminates and silicates of calcium.

Thus high furnace slag is formed partly of a glass composed amongst other things of gehlinite, $2CaO.Al_2O_3.SiO_2$, akermanite, $2CaO.MgO.2SiO_2$, and Wollastonite. In the terms of the invention, that part of these silicates not transformed into weakly basic calcium silicate during alkaline attack, or that part which has not taken part In the geopolymerisation reaction once the ratio $K_2(H_3SiO_4)_2 + Ca(H_3SiO_4)_2$ to $(Si_2O_5,Al_2O_2)$ has reached a value of 1, these silicates and alumino-silicates will hydrate according to the appropriate known mechanism for the silicates of calcium constituting hydraulic cements. There is then obtained, as well as the geopolymer (K,Ca)(—Si—O—Al—Si—O—) the formation of hydrated gehlinite, of C-S-H, of hydrated calcium aluminate and of other silicates of magnesia. In opposition to pure geopolymer compounds, these hydrated compounds are very sensitive to acid leaching. In the term of the present invention and In order to prevent any weakness in the solidified materials, these hydrated compounds may only be present in very small quantity. It is therefore appropriate to remain as close as possible to the stochiometric quantities recommended by the method of the present invention. Analysis by MAS-NMR spectrometry for $^{27}Al$ will show the presence of peaks corresponding both to Al(IV) and Al(VI) coordination. In general, in the terms of the present invention, the concentration of Al(IV) is 4 to 6 times higher than that of Al(VI). It can be lower if to the mixture are added other silico-aluminous or aluminous fillers, but, even in this case, the ratio between the concentration of Al(IV) and Al(VI) will be Al(IV)/Al(VI) equal to or greater than 1.

In the MAS-NMR spectrum of $^{29}Si$, these same basic calcium silicates lead to the presence of both $SiO_4$ tetrahedra ($Q_4$), ($Q_0$), ($Q_1$), ($Q_2$). In general the concentration of $SiO_4$ ($Q_4$) is 4 to 6 times higher than the sum of the concentrations of $SiO_4$ tetrahedra $(Q_0)+(Q_1)+(Q_2)$, and according to the nature of the fillers we will have $(Q_4)/[(Q_0)+(Q_1)+(Q_2)]$ equal to or greater than 1.

High furnace slag Is a cheap source of wollastonite, gehlinite and ackermanite. The geopolymeric mineral compositions of this Invention which contain high furnace slag enable the production of a geopolymeric mineral binder containing:

a) 100 parts by weight of alumino-silicate oxide ($Si_2O_5,Al_2O_2$), in which the Al cation is (IV-V) coordinated as determined by MAS-NMR spectrometry for $^{27}Al$, and b) 48–72 parts of potassium disilicate $K_2(H_3SiO_4)_2$, and c) 50–70 parts of high furnace slag of average grain size 10 microns, composed partly of gehlinite, ackermanite wollastonite; the mortar obtained by adding a quantity of water such that the water/binder ratio lies between 0.20 and 0.27, and a quantity of normalised sand such that the binder/sand ratio is 0.38, cold hardens and after 4 hours at 20° C. develops a compressive strength equal to or greater than 15 MPa.

Forss' patent requires a very fine grinding of the slag, in the range of 400–800 $m^2/kg$ specific area. In opposition, in the present invention, the grain size of the slag is m the range of 10–15 microns, i.e. coarser, with 300 $m^2/kg$ specific area. In the present invention, the vitreous calcium silicates have a grain size in the range of 10 microns, whereas the vitrified ashes already mentioned above, those containing basic calcium silicates and produced in high-temperature power plants, may have a smaller grain size and do not require any grinding.

When manufacturing conditions do not allow the alkaline disilicate $K_2(H_3SiO_4)_2$ to be obtained directly, the 48 to 72 parts of potassium disilicate are replaced by a powder mixture containing 35–40 parts of potassium silicate, $K_2O,3SiO_2,3H_2O$ 7–15 parts of potassium hydroxide, KOH, anhydrous to 90%

0–65 parts of amorphous silica.

The comparison between the weight ratio of slag/water enables a clear distinction to be made between geopolymeric compositions according to the present invention and previous knowledge. The Sawyer/Davidovits patent indicates the limiting values of this ratio, beyond which it is no longer possible to use the binders so produced since the mixture sets immediately in the mixer, the setting being practically instantaneous. It should also be noted that the formulation 'Geopolymer, Example II' which uses the maximum slag, also contains calcium fluoride $CaF_2$. Now, it is known that fluorides have a retarding action on the formation of weakly basic calcium silicate, and therefore on the precipitating action of $Ca^{++}$ ions, thus favourising a longer setting time, by avoiding the effect of false setting.

On the other hand, in the terms of the present invention, setting is considered as slow, since it takes place after a time longer than 30 minutes without addition of retarding agent. enabling It to be used In Industry with standard mixers. All workers In the field will understand the advantage of this setting parameter of $t > 30$ minutes at 20° C.

The table shows setting times for different ratios by weight of slag/water, of compositions involving solutions of alkaline silicate (Davidovits/Sawyer U.S. Pat. No. 4,509,985) and geopolymeric compositions containing powdered alkaline disilicates according to the present invention.

|  | slag/water ratio | | | | |
| --- | --- | --- | --- | --- | --- |
|  | 1.0 | 0.85 | 0.70 | 0.55 | 0.42 |
| start of setting U.S. Pat. No. 4,509,985 (at 73° F., 23° C.) | 0 | 0 | 12 min | 30 min | 60 min |
| present invention (at 20° C.) | 30 min | 60 min | 90 min | 3 hours | |

It is well known to workers In the field that the lower the amount of water In the cement, the higher the mechanical strengths. In the prior state of the art, the maximum slag/water ratio is 0.70. For workability, mortars and concretes require in general minimum setting times of 30 minutes, which, in U.S. Pat. No. 4,509,985 imposes a slag/water ratio of 0.55. But this large amount of water causes the compression strength Sc to fall by about 30%. On the other hand, in the present invention, the workability of the mortar Is good even with a slag/water ratio of 1.0. High mechanical strengths are then obtained, with in addition all the other characteristics which accompany the low quantity of water, such as, for example, high bulk density and low porosity, and this with a reduction of more than 200% to 300% of the most expensive constituent, the disilicate $(Na_2,K_2)(H_3SiO_4)_2$.

In place of potassium disilicate, $K_2(H_3SiO_4)_2$, 42 to 64 parts of sodium disilicate, $Na_2(H_3SiO_4)$, can be used, or a mixture of the two silicates. This allows use of impure alkalis containing both potassium and sodium. This is often the case In industrial wastes very rich in alkalis such as filter dusts from calcinating ovens for portland cement, or alkaline washings from the mining and chemical industries.

The point of the present Invention Is also that use of powdered alkaline disilicate $(Na_2,K_2)(H_3SiO_4)$ enables the use of cheap raw materials from industrial wastes. A useful source of amorphous silica is silica dust recuperated from the filters above ferro-silicon steel fusion furnaces. These dusts contain 90–95% of $SiO_2$, carbon, and 0.5–1% of finely dispersed silicon metal. These silica dusts enable production of alkaline disilicate at very low or even ordinary (room) temperatures. On the other hand, with silicious sands, it is generally necessary to use an autoclave to make the alkaline hydroxides react, or in fusion when alkaline carbonates are used. Naturally occurring amorphous silica such as diatomaceous earths, smectites, highly silicious gaizes, volcanic glasses and highly silicious pozzolans can also be used. Silica-rich ashes, obtained by plant calcination (rice, for example), can also be used here.

Manufacture of the alumino-silicate oxide $(Si_2O_5,Al_2O_2)$ is carried out by treating kaolinitic clays between 650° C. and 800° C. Kaolinitic sands can be used as raw materials, and also some clays containing kaolinitic, montmorionite and illite together; also lateritic soils and laterites containing kaolinite. Tests carried out on pyrophilites show them to be suitable for geopolymerisation.

Raw material thermal treatment temperatures must be controlled in such a way that they give optimal production of alumino-silicate oxide $(Si_2O_5,Al_2O_2)$ having the highest concentration of Al in Al(IV-V) coordination as determined by MAS-NMR spectroscopy for $^{27}Al$. Silicious materials which, for technical reasons, have also to undergo roasting, will be treated at temperatures below the temperature of transformation of amorphous silicates into cristobalite when they are required for use as raw material in the production of powdered alkaline disilicate $(Na_2,K_2)(H_3SiO_4)_2$. In general, this temperature is close to 700° C.

The alkalis are generally the hydroxides of sodium and/or potassium manufactured industrially by electrolysis. They can also come from chemical reaction between an alkaline salt and calcium hydroxide or a material producing this in situ. Alkaline salts are chosen from sodium and potassium carbonates, potassium sulphate, potassium sulphite.

The following examples are illustrative of the present invention. They in no way reflect a limit on the overall scope of the invention as set out in the clams. All parts are by weight.

EXAMPLE 1

Preparation of the powdered alkaline disilicate $K_2(H_3SiO_4)_2$ has been carried out by us in the following way: silica dust (130 parts by weight) is mixed with 90% KOH (125 parts): water (30 parts) is then added. After a certain time the mixture exhibits exothermic behaviour and begins to froth (action of KOH on silicon metal). It acquires the consistency of a dough which then cools and hardens into a foamed and very friable material. A product highly soluble in cold water is obtained, containing 86% of dry matter and 14% of water, corresponding to technical potassium disilicate $K_2(H_3SiO_4)_2$ with 3–5% of impurities in the form of insoluble carbon and potassium silico-aluminate.

EXAMPLE 2-COMPARATIVE

Following example 2 of the Sawyer/Davidovits U.S. Pat. No. 4,509,985, a mixture is prepared containing
  222 g oxide $(Si_2O_5,Al_2O_2)$,
  28 g 90% KOH
  to which is added a previously prepared liquid mixture containing 310 g of powdered disilicate as in example 1) and 290 g water,
  followed by 220 g. high furnace slag The binder thus obtained is used to make up a mortar with a binder/sand ratio of 0.38 and in which the water/binder ratio is 0.27

The mortar starts to set after 15 mins. and a compression strength Sc=16 MPa at 20° C. after 4 hours.

The molar ratio $K_2(H_3SiO_4)_2/(Si_2O_5,Al_2O_2)$ is equal to 1.12 and the slag/alkaline disilicate weight ratio is equal to 0.73 for a slag/water weight ratio of 0.75.

EXAMPLE 3-COMPARATIVE the following mixture is made:
  22 parts of oxide $(Si_2O_5,Al_2O_2)$
  13 parts of slag
  18 parts of silica dust
  36 parts of a previously prepared liquid mixture containing 12 parts of disilicate prepared according to example 1), 4 parts of KOH and 20 parts of water.

The mortar is made according to example 2). Setting takes place after 3 hours and Sc=2 MPa at 20° C. after 4 hours.

The molar ratio $K_2(H_3SiO_4)_2/(Si_2O_5, Al_2O_2)$ is equal to 0.43. The slag/alkaline disilicate weight ratio is equal to 1.08 and the slag/water weight ratio=0.65.

EXAMPLE 4-COMPARATIVE

The following mixture is made:
  22 parts of oxide $(Si_2O_5,Al_2O_2)$
  15 parts of slag
  18 parts of silica dust
  40 parts of a previously prepared liquid mixture containing 15 parts of disilicate prepared according to example 1), 4 parts of KOH and 22 parts of water.

The mortar is prepared as in example 2). Setting takes place after 2.5 hours and Sc=4 MPa at 20° C. after 4 hours, with a water/binder ratio=0.29.

EXAMPLE 5-COMPARATIVE

The following dry mixture is made:
  22 parts of $(Si_2O_5,Al_2O_2)$
  15 parts of slag
  20 parts of silica dust 11 parts of KOH
the send is then added, and finally 25 parts of water. A mortar as in example 2) is thus obtained. No setting takes place, even after 24 hours at 20° C.

EXAMPLE 6

The following dry mixture is made:
27 parts of $(Si_2O_5,Al_2O_2)$
21 parts of slag
15 parts of silica dust
19 parts of potassium disilicate $K_2(H_3SiO_4)_2$ prepared according to example 1)
215 parts of normalised sand are then added followed by
21.5 parts of water.

Setting starts after 35 minutes, and the strength Sc after 4 hours at 20° C. is 16 MPa, with a water/binder ratio=0.26

The molar ratio $K_2(H_3SiO_4)_2/Si_2O_5,Al_2O_2)$ is equal to 0.58. The slag/alkaline disilicate weight ratio is equal to 1.10 and the slag/water weight ratio=1.023.

EXAMPLE 7

The powdered binder from Example 6 is used for the solidification and stabilization of mining tailings which contain heavy metals like those described in the Example 1) of Davidovits' U.S. Pat. No. 4,859,367, according to following process:

32.5 kg of tailings are blended with 50 kg of sand, and 17.5 kg of the binder of Example 6. After mixing, water is added to the blend providing a ratio water/binder lower than 0.27. The mortar obtained is then cast into molds and vibrated to remove entrained air. The testbars harden within 35 minutes at ambient temperature. After 4 hours of cure at 20° C., the compressive strength Sc is 15 MPa.

The samples are tested according to the acidic leachate procedure, Canadian Regulation 309 as stated here above. All toxic elements have been locked within the geopolymeric framework.

EXAMPLE 8

25 kg supplementary binder of Example 6 are added to the blend of Example 7. The sample hardens under the conditions set forth in Example 7 and have a compressive strength of 25-30 MPa (3700-4400 PSI) after 4 hours cure at 20° C. This strength is identical to the compressive strength disclosed in the prior art of D. C. Comrie and al. for GEOPOLYMITE binders, but where the cure is carried out during 48 hours. This strength is also equivalent to the compressive strength disclosed in Example 2) of Davidovits U.S. Pat. No. 4,859,367, with GEOPOLIMITE binders, but after curing at 60° C. for 4 hours and subsequent hardening during 14 days.

Workers in the field will understand how important it can be to have a method which allows the ultra-rapid stabilization of sites contaminated with toxic elements. Due to the high early strength, the part of the soil stabilized and solidified according to the method set forth in the present invention can deal as access way for heavy motorised trucks, within only 2 to 3 hours after solidification took place.

Naturally, various modifications can be introduced to geopolymeric cements and to the process described above, by workers in the field, while remaining within the terms of the invention.

I claim:

1. In a method of consolidating toxic wastes for long-term disposal thereof, comprising reacting said wastes with a binder, the improvement wherein
said binder is a geopolymeric compound in powder form comprising
(a) 100 parts by weight of alumino-silicate oxide $(Si_2O_5,Al_2O_2)$ having the Al cation in (IV-V) coordination as determined by MAS-NMR analytical spectroscopy for $^{27}Al$,
(b) 42-64 parts of sodium disilicate $Na_2(H_3SiO_4)_2$ and
(c) 50-70 parts of vitreous basic silicate, composed partly of at least one of gehlinite, akermanite and wollastonite,
said geopolymeric compound providing a compressive strength greater than 15 MPa after only four hours at 20° C. when tested in a standard mortar with a binder/sand ratio of 0.38, in the substantial absence of Portland cement, and
mixing of said toxic waste with said geopolymeric compound is carried out in the absence of water, followed by adding water so as to provide a water/binder ratio lower than 0.27, thereby obtaining hardening and capture of said toxic waste within a resultant geopolymeric matrix in the substantial absence of Portland cement.

2. In a method of consolidating toxic wastes for long-term disposal thereof, comprising reacting said wastes with a binder, the improvement wherein
said binder is a geopolymeric compound in powder form comprising
(a) 100 parts by weight of alumino-silicate oxide $(Si_2O_5,Al_2O_2)$ having the Al cation in (IV-V) coordination as determined by MAS-NMR analytical spectroscopy for $^{27}Al$,
(b) 48-72 parts by weight of potassium disilicate $K_2(H_3SiO_4)_2$ or a mixture of (i) 35-40 parts of potassium silicate $K_2O, 3SiO_2, 3H_2O$, (ii) 7-15 parts of potassium hydroxide KOH which is at least 90% anhydrous, and (iii) an amount of amorphous silica up to 65 parts, and
(c) 50-70 parts of vitreous basic silicate, composed partly of at least one of gehlinite, akermanite and wollastonite,
said geopolymeric compound providing a compressive strength greater than 15 MPa after only four hours at 20° C. when tested in a standard mortar with a binder/sand ratio of 0.38, in the substantial absence of Portland cement, and
mixing of said toxic waste with said geopolymeric compound is carried out in the absence of water, followed by adding water so as to provide a water/binder ratio lower than 0.27, thereby obtaining hardening and capture of said toxic waste within a resultant geopolymeric matrix in the substantial absence of Portland cement.

3. In a method of consolidating toxic wastes for long-term disposal thereof, comprising reacting said wastes with a binder, the improvement wherein
said binder is a geopolymeric compound in powder form comprising the following reactive constituents:
(a) an alumino-silicate oxide $(Si_2O_5,Al_2O_2)$ in which the Al cation is in (IV-V) coordination as determined by MAS-NMR analytical spectroscopy for $^{27}Al$,
(b) a disilicate of sodium and/or potassium $(Na_2,K_2)(H_3SiO_4)_2$;
(c) a silicate of calcium the molar ratios between the three reactive constituents being equal to or between $$\frac{(Na_2,K_2)\,(H_3SiO_4)_2}{Si_2O_5,Al_2O_2)} \quad 0.40 \text{ and } 0.60$$

$$\frac{Ca^{++}}{Si_2O_5,Al_2O_2} \quad 0.60 \text{ and } 0.40$$

such that $$\frac{(Na_2,K_2)\,(H_3SiO_4)_2}{Si_2O_5,Al_2O_2)} + Ca^{++} = 1.0$$

where $Ca^{++}$ designates the calcium ion belonging to a weakly basic silicate of calcium whose atomic ratio Ca/Si is lower than 1, said geopolymeric compound providing a compressive strength greater than 15 MPa after only four hours at 20° C. when tested in a standard mortar with a binder/sand ratio of 0.38, in the substantial absence of Portland cement, and mixing of said toxic waste with said geopolymeric compound is carried out in the absence of water, followed by adding water so as to provide a water/binder ratio lower than 0.27, thereby obtaining hardening and capture of said toxic waste within a resultant geopolymeric matrix in the substantial absence of Portland cement.

4. A method of consolidating toxic waste according to claim 3 wherein said geopolymeric binder corresponds to the formation of a geopolymer of the type (Ca,K)-poly(sialate-siloxo) of formula varying between (0.6K+0.2Ca)(—Si—O—Al—O—Si—O—), $H_2O$ and (0.4K+0.3Ca) (—Si—O—Al—O—Si—O—), $H_2O$.

5. A method of consolidated toxic waste according to claim 3 wherein said silicate of calcium is selected from the group consisting of gehlinite, akermanite, wollastonite and mixtures thereof.

* * * * *